(12) United States Patent
Khare et al.

(10) Patent No.: US 9,240,181 B2
(45) Date of Patent: Jan. 19, 2016

(54) AUTOMATIC COLLECTION OF SPEAKER NAME PRONUNCIATIONS

(71) Applicant: Cisco Technology, Inc., San Jose, CA (US)

(72) Inventors: Aparna Khare, San Jose, CA (US); Neha Agrawal, San Jose, CA (US); Sachin S. Kajarekar, Sunnyvale, CA (US); Matthias Paulik, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 13/970,850

(22) Filed: Aug. 20, 2013

(65) Prior Publication Data

US 2015/0058005 A1   Feb. 26, 2015

(51) Int. Cl.
*G10L 15/00* (2013.01)
*G10L 15/26* (2006.01)
*G10L 15/06* (2013.01)
*G10L 15/187* (2013.01)
*G10L 15/04* (2013.01)
*G10L 17/00* (2013.01)
*G10L 15/02* (2006.01)

(52) U.S. Cl.
CPC ............ *G10L 15/063* (2013.01); *G10L 15/187* (2013.01); *G10L 15/04* (2013.01); *G10L 15/26* (2013.01); *G10L 17/00* (2013.01); *G10L 2015/025* (2013.01)

(58) Field of Classification Search
CPC ...................................... G10L 15/26
USPC .............................. 704/235, 243, 244, 246, 9
See application file for complete search history.

(56) References Cited

U.S. PATENT DOCUMENTS

| 5,212,730 A | * | 5/1993 | Wheatley | ............... G10L 15/063 704/232 |
| 6,397,182 B1 | * | 5/2002 | Cruickshank | ......... G10L 15/063 379/902 |
| 6,477,491 B1 | * | 11/2002 | Chandler | ................ G10L 15/26 704/235 |

(Continued)

OTHER PUBLICATIONS

Beaufays, et al., "Learning Name Pronunciations in Automatic Speech Recognition Systems," in Proceedings of the 15th IEEE International Conference on Tools with Artificial Intelligence (ICTAI'03), Nov. 2003, 8 pages.

(Continued)

*Primary Examiner* — Shaun Roberts
(74) *Attorney, Agent, or Firm* — Edell, Shapiro & Finnan, LLC

(57) ABSTRACT

An audio stream is segmented into a plurality of time segments using speaker segmentation and recognition (SSR), with each time segment corresponding to the speaker's name, producing an SSR transcript. The audio stream is transcribed into a plurality of word regions using automatic speech recognition (ASR), with each of the word regions having a measure of the confidence in the accuracy of the translation, producing an ASR transcript. Word regions with a relatively low confidence in the accuracy of the translation are identified. The low confidence regions are filtered using named entity recognition (NER) rules to identify low confidence regions that a likely names. The NER rules associate a region that is identified as a likely name with the name of the speaker corresponding to the current, the previous, or the next time segment. All of the likely name regions associated with that speaker's name are selected.

20 Claims, 5 Drawing Sheets

(56) References Cited

U.S. PATENT DOCUMENTS

| | | | |
|---|---|---|---|
| 7,412,392 B1* | 8/2008 | Satapathy | H04L 12/1831 370/260 |
| 7,467,087 B1* | 12/2008 | Gillick | G10L 15/26 704/235 |
| 8,131,545 B1* | 3/2012 | Moreno | G10L 15/04 704/235 |
| 8,635,243 B2* | 1/2014 | Phillips | G10L 15/22 704/235 |
| 2005/0033575 A1* | 2/2005 | Schneider | G10L 15/005 704/254 |
| 2006/0047500 A1* | 3/2006 | Humphreys | G06F 17/278 704/9 |
| 2006/0047502 A1* | 3/2006 | Ramsey | G06F 17/2785 704/10 |
| 2006/0217966 A1* | 9/2006 | Hu | G06F 17/30743 704/200 |
| 2009/0150153 A1* | 6/2009 | Li | G10L 13/08 704/254 |
| 2009/0306981 A1* | 12/2009 | Cromack | G06F 17/30743 704/235 |
| 2010/0063815 A1* | 3/2010 | Cloran | G06Q 30/02 704/235 |
| 2011/0022386 A1* | 1/2011 | Gatzke | G10L 15/06 704/235 |
| 2012/0143605 A1* | 6/2012 | Thorsen | G10L 15/183 704/235 |
| 2013/0058471 A1* | 3/2013 | Garcia | H04M 3/42221 379/202.01 |

OTHER PUBLICATIONS

Choueiter, et al., "Automatic Lexical Pronunciations Generation and Update," in Proc. of ASRU, Kyoto, Japan, Dec. 2007, 6 pages.

Dufour, et al., "Automatic transcription error recovery for Person Name Recognition," in Proc. Interspeech, Portland, Oregon, Sep. 2012, 4 pages.

Fosler, et al., "Automatic Learning of Word Pronunciation from Data," in Proceedings of the International Conference on Spoken Language Processing, Oct. 1996, 2 pages.

Goronzy, et al., "Generating Non-Native Pronunciation Variants for Lexicon Adaptation," Speech Communication, vol. 42, No. 1, Jan. 2004, 4 pages.

Stouten, et al., "Recognition of foreign names spoken by native speakers," in Proc. Interspeech 2007, Antwerp, Belgium, Aug. 2007, 4 pages.

* cited by examiner

AUTOMATIC COLLECTION OF SPEAKER NAME PRONUNCIATIONS

TECHNICAL FIELD

The present disclosure relates to automatic speech recognition of personal names.

BACKGROUND

One method of creating machine generated pronunciation of names is to use grapheme-to-phoneme (G2P) tools to convert the letter string of a given name into phoneme sequences. These G2P tools are either rule based or apply statistical models that are learned from human created dictionaries. They are especially error prone for names, given the wide variety of pronunciations for a given spelling of a name depending on both the named person and the person speaking the name.

Another method of creating machine generated pronunciation of names is to ask a set of users to speak all personal names for which a pronunciation is to be learned. The resulting audio samples are then converted to phoneme sequences by applying a phonetic recognizer. A variation of this approach is to pick from multiple pronunciations that were created with a G2P tool by picking the G2P pronunciation(s) that are closest to the pronunciation(s) used by the speakers. This data-driven method is capable of yielding more accurate pronunciations than the first method, but it requires users to explicitly provide speech samples for all names.

DESCRIPTION OF EXAMPLE EMBODIMENTS

Overview

Figure 1:
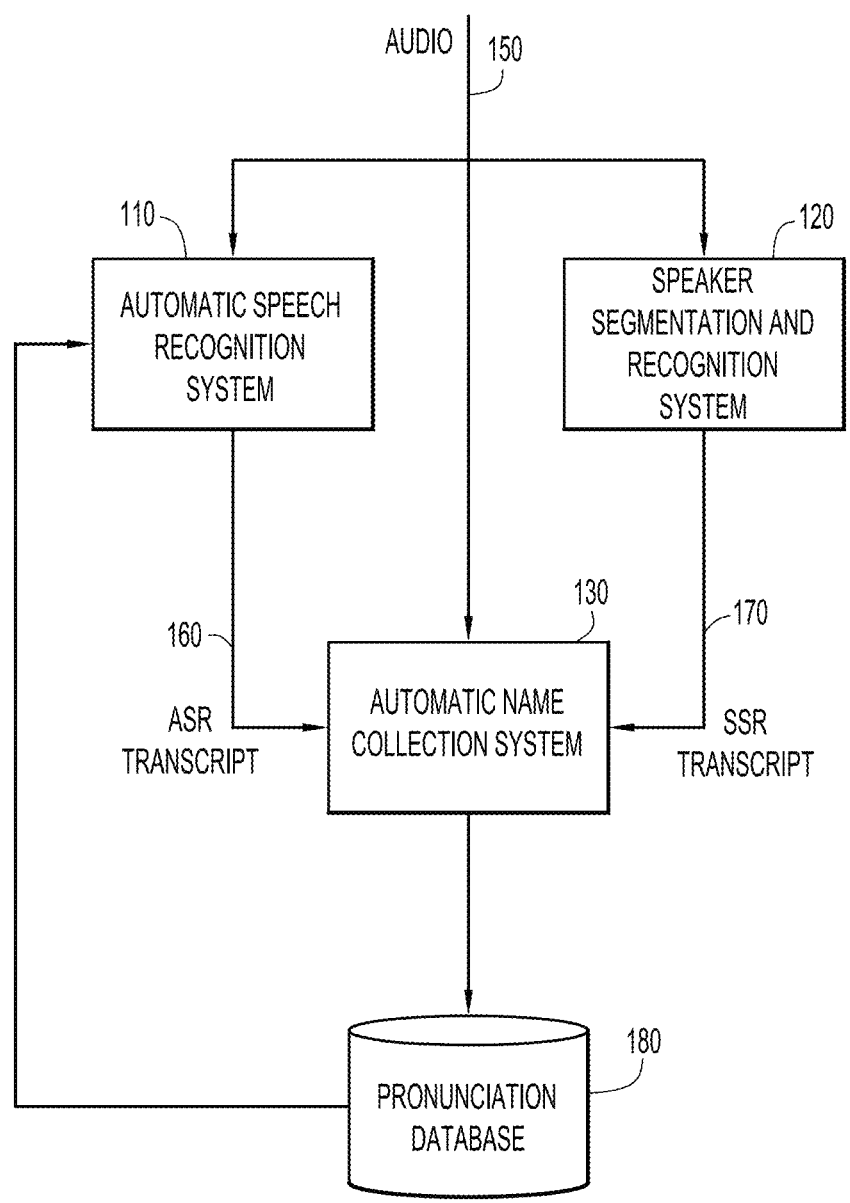
FIG. 1 is a block diagram of an overview of the main components in an example embodiment of a system for automatically collecting pronunciations of names.

A media stream, such as an audio stream is segmented into a plurality of time segments using speaker segmentation and recognition (SSR), with each time segment corresponding to the speaker's name, producing an SSR transcript. The audio stream is transcribed into a plurality of word regions using automatic speech recognition (ASR), with each of the word regions having a measure of the confidence in the accuracy of the translation, producing an ASR transcript. Word regions with a relatively low confidence in the accuracy of the translation are identified. Named Entity Recognition (NER) rules are used to identify likely name regions within the ASR transcript. The low confidence regions are filtered against the likely name regions to identify low confidence regions that are likely to correspond to spoken names. The NER rules associate a region that is identified as a likely name region with the name of the speaker corresponding to the current, the previous, or the next time segment. For a speaker's name, all of the likely name regions associated with that speaker's name are selected and a phoneme transcript is created for each of the likely name regions. The speaker's name is correlated with all of the phoneme transcripts. Additionally, the same speaker may have multiple names, such as nicknames or full names, across different parts of the audio stream.

Example Embodiments

Recognizing personal names has been a weak point for automatic speech recognition systems. There are various factors that combine to make the pronunciation of personal names difficult to automatically recognize from spoken audio. Some of these factors include geographic and cultural influences of both the person speaking the name and the named individual. Without the skills of a human linguist, a pronunciation database may not pick up and properly attribute all of the various ways that people say personal names.

A more robust pronunciation database is created automatically by combining three technologies: speaker segmentation and recognition (SSR), automatic speech recognition (ASR), and named entity recognition (NER). An audio stream processed by all of these technologies can produce entries in a pronunciation database that provides a proper correspondence between a name and the multitude of ways to pronounce that name. For example, an audio stream of a round table discussion between six participants (Alice, Bob, Charlie, Dan, Eton, and Francine) can return at least six entries in the pronunciation database for the name Eton, one for each of the participants when they say "Eton." Additional pronunciations may be automatically attributed to a person's name based on variants used in the discussion. Dan may also be called Daniel or Danny, depending on the relationship between the speaker and Dan. At some points in the conversation, last names or full names may also be used, such that Dan may be called Dan Chwirut or Mr. Chwirut. All of these variations are captured automatically and correctly attributed to the correct person, as described hereafter.

Phoneme strings are a representation of the sounds in an audio stream. One example of phonemes is the spoken word "stop" represented by the phonemes /s/ /t/ /aa/ /p/. The string of phonemes captures how different pronunciations of names can vary. For instance, the name "Eton" could be pronounced /ee/ /t/ /aw/ /n/, or it could be /ay/ /t/ /aw/ /n/. One of the outcomes of the system described herein is that both of these pronunciations will be properly associated to the same person. Thus, when the system encounters either of these pronunciations in a future audio stream, it can accurately transcribe it as "Eton."

In FIG. 1, an audio stream 150, which may be stored in one or more files, is provided as an input to three systems: an ASR system 110, a SSR system 120, and an Automatic Name Collection (ANC) system 130. ASR system 110 processes audio stream 150 and produces an automatic speech recognition transcript 160. SSR system 120 processes audio stream 150 and produces a speaker segmentation and recognition transcript 170. ANC system 130 takes audio stream 150, ASR transcript 160, and SSR transcript 170 and produces phoneme strings of name pronunciations corresponding to text strings of name labels provided by SSR system 120. These correlated phoneme strings and name label strings are entered into pronunciation database 180, where they can be used in future attempts by ASR system 110 to recognize spoken words, including names. Pronunciation database 180 may also be used in other aspects of audio systems, such as speech synthesis.

ASR system 110 converts spoken words in audio stream 150 to written ASR transcript 160. Every word in ASR transcript 160 is given a confidence estimate by ASR system 110. The word region where a name is spoken, but misrecognized due to missing or misrecognized pronunciation database entries, is typically identified by a low confidence estimate. Low confidence regions are identified as word regions with a confidence estimate below a specific threshold. This confidence estimate can be influenced several factors including limited initial vocabulary in pronunciation database 180, audio conditions, and speaker accents and diction. ASR system 110 may give a low confidence to a word region for a variety of reasons, including background noise. Therefore, low confidence regions are not just limited to misrecognized names.

Figure 2:
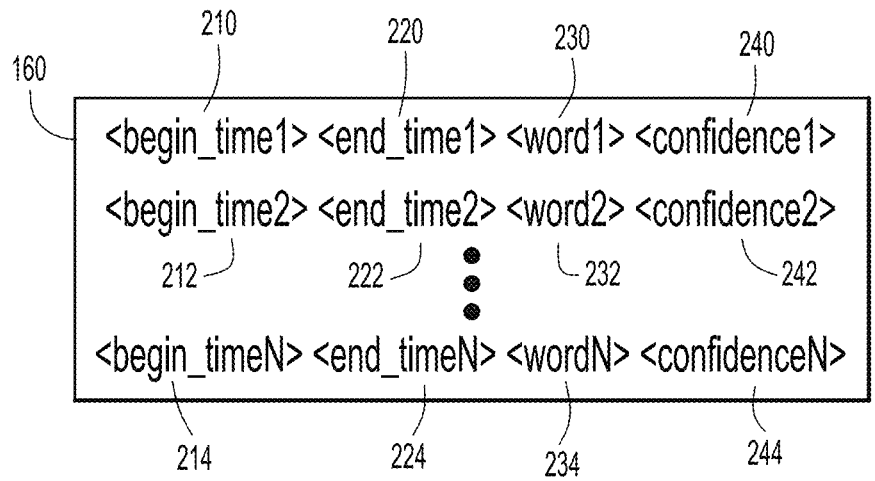
FIG. 2 is an example of an Automated Speech Recognition transcript.

One generic example of ASR transcript 160 shown in FIG. 2 has a format that identifies the beginning time 210 of the first recognized word, the end time 220 of the first recognized word, and word region 230 of the first recognized word 230 with its associated confidence 240. Word region 230 is a text string that ASR system 110 has matched to a spoken section of audio stream 150. Multiple word regions 230, 232, 234 may be included in a single ASR transcript 160. Each word region 230, 232, 234 will have respective beginning times 210, 212, 214, end times 220, 222, 224, and associated confidence values 240, 242, 244. In one approach, the confidence values 240, 242, 244 are numeric values that can be compared to a threshold. In another approach, the confidence values have already been compared to a threshold before creating ASR transcript 160, and confidence values 240, 242, 244 are binary values indicating high confidence or low confidence.

For a more specific example of ASR transcript 160, consider a speaker named Dan who introduces himself by saying "Hi, this is Dan and I am the first presenter today." ASR system 110 takes the audio stream 150 of that statement, and converts it into {09:01:27.3, 09:01:27.5, <hi>, 0.8; 09:01:27.6, 09:01:27.8, <this>, 0.9; 09:01:27.9, 09:01:28.1, <is>; 0.8; 09:01:28.2, 09:01:28.5, <man>, 0.2; 09:01:28.6, 09:01:28.8, <and>, 0.9; 09:01:28.9, 09:01:29.0, <i>, 0.9; 09:01:29.1, 09:01:29.3, <am>, 0.9; 09:01:29.4, 09:01:29.6, <the>, 0.8; 09:01:29.7, 09:01:30.1, <first>, 0.9; 09:01:30.2, 09:01:31.0, <presenter>, 0.9; 09:01:31.1, 09:01:31.6, <today>, 0.9}. In this example, ASR system recognized all of the words correctly, and with a relatively high confidence (0.8 or 0.9), except for the name. The name "Dan" was misrecognized as "man," but was given a relatively low confidence value (0.2). In this example, ASR system 110 grouped multiple words into a single transcript, but in another example, each detected word is in a separate transcript.

SSR system 120 segments audio stream 150 into speaker homogenous regions and labels these regions with name labels of the speaker, providing SSR transcript 170. Speaker labeling is done in a semi-supervised manner. Speaker recognition is based on voice pattern matching, with an initial labeling performed by a user. As soon as a user labels a segment with a particular voice pattern, SSR system 120 also labels segments with a matching voice pattern with the same label. Segments with matching voice patterns are labeled in the current audio stream 150 as well as any other audio streams that SSR system 120 can access, including audio streams previously processed and audio streams that will be processed in the future.

Figure 3:
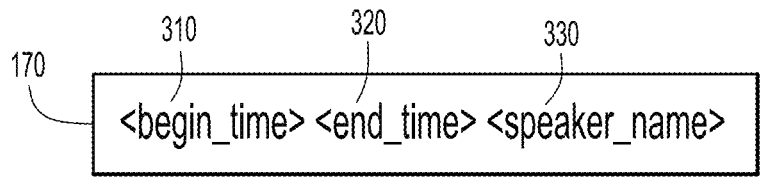
FIG. 3 is an example of a Speaker Segmentation and Recognition transcript.

One generic example of SSR transcript 170 shown in FIG. 3 identifies the beginning time 310 of the segment, the end time 320 of the segment, and the name label 330 of the speaker. Name label 330 corresponds to a particular voice pattern that is recognized in audio stream 150 from beginning time 310 to end time 320. According to one option, name label 330 is a text string of the speaker's full name. In another option, name label 330 is a text string of a nickname used by the speaker.

For a more specific example of SSR transcript 170, consider a conference presentation where host Alice Cooper introduces speakers Dan Chwirut, Bob Jones, and Charlie Smith, who each take turns giving their portion of the presentation. At the end of the presentation, Alice returns and thanks the speakers. SSR system 120 recognizes each of their voice patterns in audio stream 150 and produces SSR transcript 170 that looks like: {09:00:12.6, 09:01:16.2, Alice Cooper; 09:01:27.3, 09:23:52.7, Daniel Chwirut; 09:23:54.1, 09:36:01.4, Robert Jones; 09:36:3.9, 09:56:12.7, Charles Smith; 09:56:14.1, 09:58:21.0, Alice Cooper}.

Figure 4:
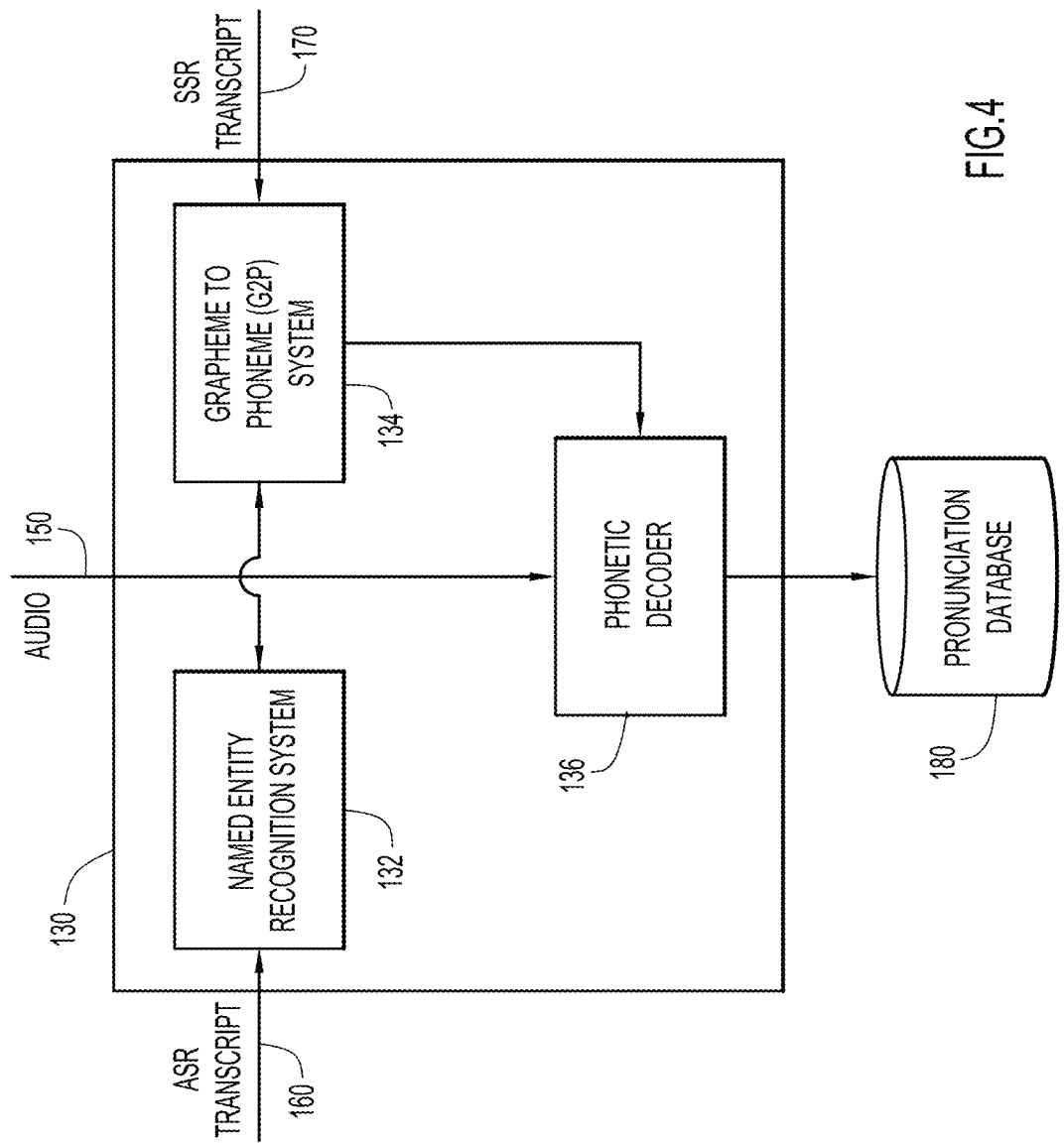
FIG. 4 is a block diagram of an Automatic Name Collector module.
Figure 5:
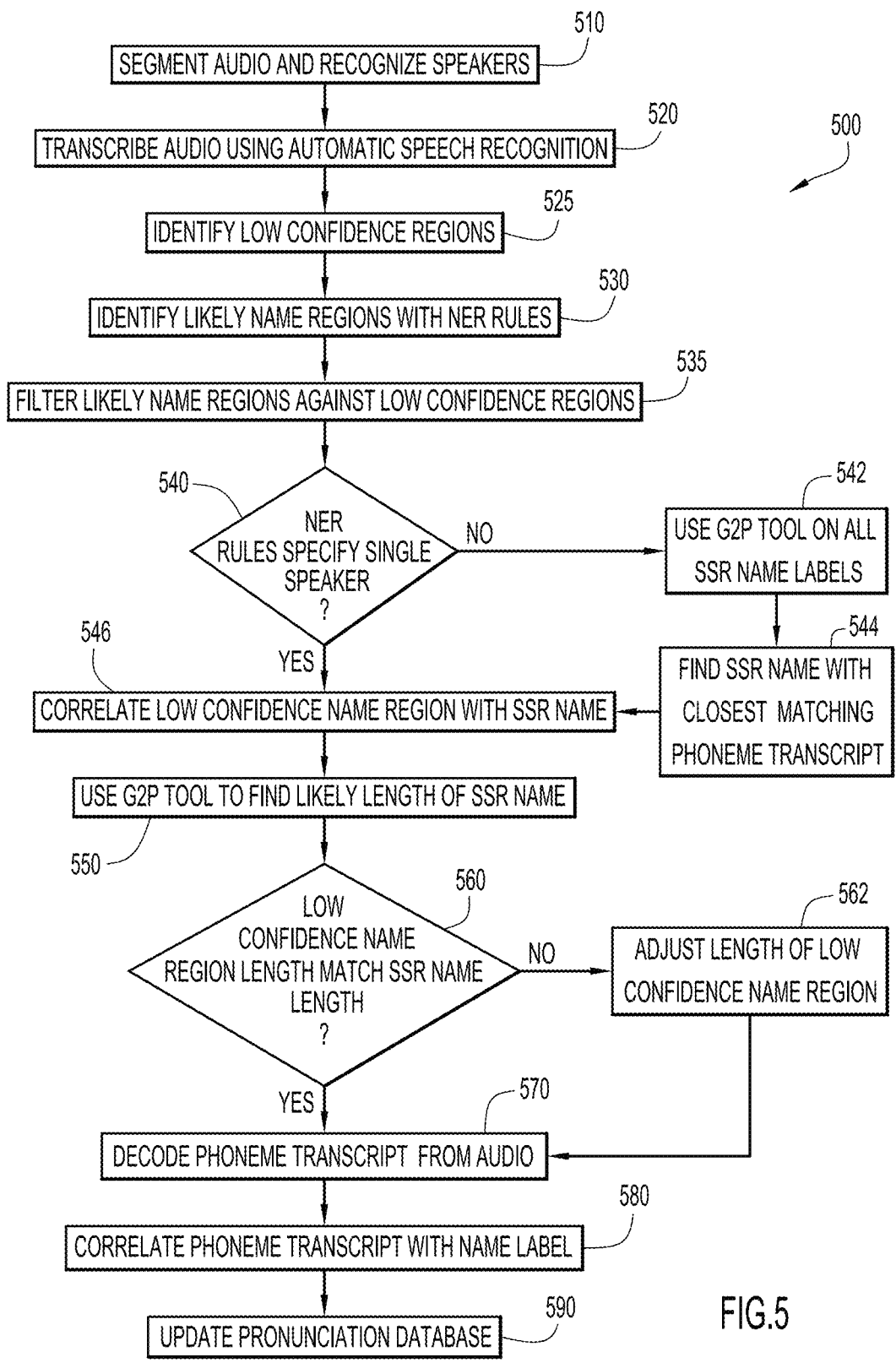
FIG. 5 is a flow chart of an automatic name pronunciation collection method.

After audio stream 150 has been processed by ASR system 110 and SSR system 120, there are three related sets of data. First, the original audio stream 150 contains a timed sound recording. Second, ASR transcript 160 contains a time stamped series of text words recognized from the speech and confidence values that each word has been recognized accurately. Third, SSR transcript contains a time stamped series of speaker names. ANC system 130 uses each of these three sets of data to find and collect name pronunciations and associates the pronunciations with the appropriate name. That analysis generates phoneme strings of the pronunciation from audio stream 150 associates them with name labels, i.e., text strings of the name. ANC system 130 is shown in FIG. 4, and further described below.

ANC system 130 comprises three components: Named Entity Recognition (NER) system 132, Grapheme to Phoneme (G2P) system 134, and phonetic decoder 136. NER system 132 reads in ASR transcript 160 and applies rules to identify regions of ASR transcript 160 that are likely to be names. These rules are trained independently to recognize likely name regions from a transcript and associating the likely name region with a particular speaker. One example of a rule is that the word region after the phrase "my name is" is a likely name region of the current speaker. Other rules may identify previous or following speakers, such as the phrase "let me introduce" will be followed by the name of the next speaker. The phrase "thank you" followed by a low confidence region may indicate the name of the previous speaker. Still other rules may identify likely name regions, but may not be able to identify the specific segment that belongs to that name. The phrase "today we will hear from" will likely be followed by a list of names of speaker that will speak in future segments, though not necessarily in the immediately following segment. The rules described above are examples of rules that can be used to identify likely name regions from a transcript. Other rules that use various natural language processing methods are envisioned, such that regions that are likely to be names are found from the context of the conversation.

Three steps may be used to process the example ASR transcript 160 presented above, and reproduced here: {09:01:27.3, 09:01:27.5, <hi>, 0.8; 09:01:27.6, 09:01:27.8, <this>, 0.9; 09:01:27.9, 09:01:28.1, <is>; 0.8; 09:01:28.2, 09:01:28.5, <man>, 0.2; 09:01:28.6, 09:01:28.8, <and>, 0.9; 09:01:28.9, 09:01:29.0, <i>, 0.9; 09:01:29.1, 09:01:29.3, <am>, 0.9; 09:01:29.4, 09:01:29.6, <the>, 0.8; 09:01:29.7, 09:01:30.1, <first>, 0.9; 09:01:30.2, 09:01:31.0, <presenter>, 0.9; 09:01:31.1, 09:01:31.6, <today>, 0.9}. One step includes identifying low confidence regions by examining the confidence values that ASR system 110 has produced. The second step includes identifying name regions using NER rules. The third step, which in one example may be combined with the second step, includes identifying that the name region belongs to a previous/current/subsequent speaker. In this example, NER system 132 marks the word region "man" as a likely name of the person currently speaking. Since the word region "man" has also been identified as a low confidence region, it is flagged as a low confidence name region and ANC system 130 will process that region further to determine a pronunciation for that name. Additionally, because the triggering phrases are "this is" and "i am," the likely name region "man" is the name of the speaker currently talking. For example, first the triggering phrase indicates the likely name regions, and then second the low confidence region indicates a likely name. After NER system 132 has processed this example of ASR transcript 160, the time region corresponding to "man" has been marked as the time where a name has probably been spoken, and that the name spoken is the name of the speaker who is currently talking at that time.

NER system 132 may also be used to filter the low confidence regions identified in ASR transcript and remove low confidence regions that are not likely to be names. Any low confidence regions that NER system 132 does not recognize as a likely name region may be ignored, and processing will continue only with the low confidence name regions. In some examples, NER system 132 applies NER rules to the entire ASR transcript 160 before filtering the likely name regions with the low confidence regions. Alternatively, NER system 132 may only consider low confidence regions as possible name regions. In both cases, NER system 132 produces a set of low confidence regions that are likely to be names. In another example, name regions with may be recognized with a relatively high confidence, and ANC system 130 continues to process the name region in order to increase the weighting of that pronunciation in association with that name. Thus, name regions with any confidence value may be processed and contribute to the goal of creating a mapping in pronunciation database 180 of a person's name with all variations in pronunciations. If the pronunciation exists, it is recognized, and the weight of that pronunciation is increased. If the pronunciation does not exist, then it is added to pronunciation database 180 associated with the person's name.

If NER system 132 specifies that a likely name region is associated with a particular speaker segment (i.e., current, previous, or next speaker), then ANC system 130 compares the time stamp from the likely name region to the time stamps in SSR transcript 170 and associates the likely name region with the appropriate name label. In some cases, NER rules may not precisely pinpoint which speaker the likely name region should be associated with. For example, NER system 132 may encounter an ASR transcript similar to "Later we will hear from [low confidence region], who will tell us about synthetic heart valves." In this case, NER system knows that the low confidence region is probably a name due to the context of the surrounding speech. However, it cannot determine if the name is the name of the next speaker or the third speaker down the line.

After NER system 132 has identified the time span of a likely name region, phonetic decoder 136 can decode that time span in audio stream 150 to generate a phoneme string of the name. If the time span accurately captures the name, and the NER rules have accurately identified the speaker and his or her name label, then the phoneme string and the associated name label can be entered into pronunciation database 180 right away. In some cases, however, either the time span is not completely accurate or the speaker has not been identified, and the system must continue to process the data.

In cases where NER system 132 could not determine which speaker to associate with a likely name region, G2P system 134 and phonetic decoder 136 assist ANC system 130 in making the determination. G2P system 134 generates a phoneme string from all of the name labels in SSR transcript 170, as well as common variants. Phonetic decoder 136 generates a phoneme string from the time span of the likely name region in audio stream 150. The phoneme string from G2P system 134 is compared to phoneme strings from phonetic decoder 136. The name label with a generated phoneme string that matches the phoneme string decoded from the likely name region, either as a whole or in part, is picked as the name label associated with likely name region.

Continuing the example above, NER system 132 is unable to use the ASR transcript "Later we will hear from [likely name], who will tell us about synthetic heart valves" to determine which speaker the likely name region should be associated with. Phonetic decoder generates a phoneme string from the time span in audio stream 150 that corresponds to the likely name region. In this example, the sounds of audio stream 150 in that time span are represented by the phonemes /ch/ /aa/ /rn /l/ /ee/. G2P system 134 would generate phoneme strings for Alice Cooper, Daniel Chwirut, Robert Jones, and Charles Smith. These phoneme strings would include variants (e.g. first name, nicknames, etc.) for each name, such as Alice (/a/ /l/ /i/ /s/), Mr. Chwirut (/ch/ /w/ /ee/ /rn /oo/ /t/), Bob Jones (/b/ /aw/ /b/ /j/ /o/ /n/ /z/), and Charlie (/ch/ /aw/ /r/ /l/ /ee/). In this example, the phoneme string decoded from audio stream 150 (/ch/ /aa/ /r/ /l/ /ee/) would most closely match the phoneme string generated from Charlie (/ch/ /aw/ /r/ /l/ /ee/). Consequently, the phoneme string /ch/ /aa/ /r/ /l/ /ee/ would be associated with the name label Charles Smith, and that association would be entered into pronunciation database 180.

In cases where the time span of the likely name region is not accurately detected, the likely name strings may also contain extra words before or after the actual spoken name. ASR system 110 will try to recognize longer strings over shorter strings to avoid chopping up long words into shorter words with similar phonemes, and may group additional phonemes into low confidence regions. These additional phonemes will not be part of the spoken name and would interfere with providing an accurate phoneme transcript of the name if they are not recognized and removed.

One method narrows down the likely name region by using G2P system 134 to generate a close, but potentially imperfect, pronunciation of the name label associated with the likely name region. By analyzing the phoneme string generated by G2P system 134, ANC system 130 can estimate the number of phonemes in the name, and calculate an approximate correct length of the speech region that has the name. Variants and nicknames of the name label may also be processed by G2P system 134 to capture all of the possible ways of pronouncing a name associated with the name label.

Once the likely name region has been narrowed down to a time segment that has only the spoken name associated with a given name label, phonetic decoder 136 decodes the time segment of audio stream 150 into a phoneme transcript and correlates that phoneme transcript with the given name label. In one embodiment, more than one likely name region is associated with a given name label, and each likely name region may have a different pronunciation of the name. Pronunciation database 180 stores each of the phoneme transcripts correlated with the name label. Database 180 may also store phoneme sequences associated with words other than names, to provide a consolidated database for use in ASR system 110.

An example of narrowing down the likely name region follows from a previous example used above for the ASR transcript. Consider the sentence "Hi, this is Dan and uh I am the first presenter today." gets transcribed as {09:01:27.3; 09:01:31.6; hi; 0.8; this; 0.9; is; 0.8; banana; 0.2; i; 0.9; am; 0.9; the; 0.8; first; 0.9; presenter; 0.9; today; 0.9}. In this case, the likely name region captured an extra word and corresponds to the spoken phrase "Dan and uh" instead of "Dan." Since NER system 132 has associated the likely name region with the speaker's name label of Daniel Chwirut, G2P system 134 generates phoneme strings for Daniel Chwirut, as well as any variants. One of the variant phoneme strings generated by G2P system 134 is /d/ /a/ /n/. Phonetic decoder 136 decodes the time span of the likely name region from audio stream 150 and generates the phoneme string /d/ /a/ /n/ /a/ /n/ /a/. ANC system 130 compares the phoneme strings and finds a partial match at the beginning of the likely name region, and it is able to narrow down the likely name region to only the time span containing the first three phonemes. The phonemes decoded from the narrowed down time span (/d/ /a/ /n/) are associated with the name label Daniel Chwirut, and that association is entered into pronunciation database 180.

An example of the process 500 carried out by the systems described above is shown in FIG. 4. In step 510, audio stream 150 is segmented into speaker homogenous segments, and each segment is associated with a name label to produce SSR transcript 170. In step 520, audio stream 150 is processed by ASR system 150 to produce ASR transcript 160 of the text of the words spoken in audio stream 150. The time stamp at the beginning and end of each word region is noted, and a confidence in the accuracy of the transcription is associated with the word region. Step 525 identifies which of the word regions is a low confidence region by comparing the confidence of the word region with a threshold.

In step 530, NER system 132 applies rules to ASR transcript 160, as described above, and identifies likely name regions. NER system 132 then filters the low confidence regions against the likely name regions to identify low confidence name regions in step 535. The NER rules may also specify a segment to which the likely name region should be associated. At step 540, ANC system 130 determines if a likely name region is associated with a single speaker segment from the SSR transcript. If the likely name region is associated with a single segment, then the likely name region is correlated with the name label from that segment at step 546. If the likely name region is not associated with a single segment, then the process continues to step 542. At step 542, G2P system 134 is used to generate phoneme transcripts of all of the name labels in SSR transcript 170, as well as any variants of the name labels. Each of the phoneme transcripts is compared to the phonemes in the low confidence name region in step 544. The phoneme transcript that matches the best, in whole or partially, is selected as the most likely name, and the process returns to step 546 to correlate the name label from the most likely name with the low confidence name region.

To narrow down the length of the low confidence name region so that it only includes the name, at step 550, G2P system 134 generates a phoneme string of the name label associated with a low confidence name region and estimates the length of time that the name will take. At step 560, the process determines if the low confidence name region is substantially the same length of time as the length of time estimated from G2P system 134. If the lengths of times differ, then, in step 562, the process adjusts the length of the low confidence name region to approximately match the length of time estimated from step 550.

Once the length of time of the low confidence name region is approximately the same length of time as the estimated length, at step 570, phonetic decoder 136 decodes the audio stream in the low confidence name region to provide a phoneme transcript of the name. In step 580, the phoneme transcript is correlated with the name label. Pronunciation database 180 is updated with the phoneme transcripts derived from audio stream 150 and the correlated name label.

Figure 6:
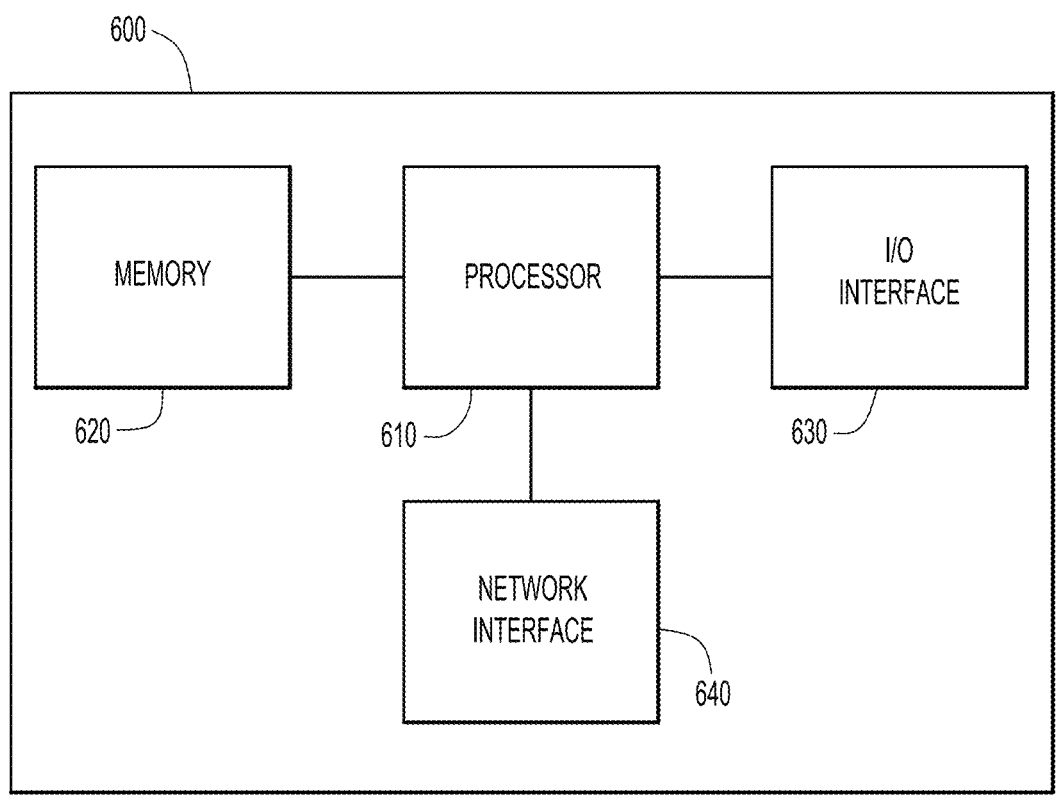
FIG. 6 is a block diagram of a computing system used to automatically collect name pronunciations.

Depicted in FIG. 6 is an example block diagram of an apparatus 600 configured to automatically collect speaker names in accordance with the techniques described herein. The apparatus 600 comprises network interface unit 640, input/output (I/O) interface 630, processor 610, and memory 620. Memory 620 may comprise read only memory (ROM), random access memory (RAM), magnetic disk storage media devices, optical storage media devices, flash memory devices, electrical, optical, or other physical/tangible (e.g., non-transitory) memory storage devices. The processor 610 is, for example, a microprocessor or microcontroller that executes instructions for process 500. Thus, in general, the memory 620 may comprise one or more tangible (non-transitory) computer readable storage media (e.g., a memory device) encoded with software comprising computer executable instructions and when the software is executed (by the processor 610) it is operable to perform the operations described herein in connection with FIGS. 1-5.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
    segmenting an audio stream into a plurality of time segments using speaker segmentation and recognition (SSR), each of the plurality of time segments corresponding to a name label, to produce an SSR transcript;
    transcribing the audio stream into a plurality of word regions using automatic speech recognition (ASR), each of the plurality of word regions having an associated accuracy confidence, to produce an ASR transcript;
    identifying a plurality of low confidence regions from the plurality of word regions, each of the low confidence regions having an associated accuracy confidence below a threshold;
    identifying at least one likely name region from the ASR transcript using named entity recognition (NER) rules, wherein the NER rules analyze word regions to identify the at least one likely name region, and the NER rules associate each of the at least one likely name regions with a name label from the SSR transcript corresponding to one of a current, previous, or subsequent time segment in the SSR transcript;
    filtering the at least one likely name region with the plurality of low confidence regions to determine at least one low confidence name region;
    selecting all of the low confidence name regions associated with a selected name label, the selected name label being selected from the name labels in the SSR transcript;
    decoding a phoneme transcript from the audio stream for each of the selected likely name regions using a phoneme decoder; and correlating the selected name label with all of the phoneme transcripts for the selected likely name regions.

2. The method of claim 1, further comprising:
creating a phoneme string of the selected name label using a grapheme-to-phoneme (G2P) tool;
matching at least a portion of the phoneme string of the selected name label with at least a portion of the phoneme transcript for each of the selected likely name regions.

3. The method of claim 1, further comprising:
creating a phoneme string of the selected name label with a grapheme-to-phoneme (G2P) tool;
adjusting a length of at least one of the selected likely name regions to match the length of the phoneme string.

4. The method of claim 1, further comprising updating a name pronunciation database, the name pronunciation database correlating a plurality of names with a plurality of phoneme transcripts.

5. The method of claim 1, wherein the name label comprises at least one of a full name, a salutation and last name, or a nickname.

6. The method of claim 1, wherein the automatic speech recognition (ASR) transcript comprises a plurality of time stamps associated with the plurality of word regions.

7. The method of claim 1, wherein identifying at least one likely name region from the ASR transcript comprises using NER rules to analyze word regions only in proximity to each of the plurality of low confidence regions.

8. One or more non-transitory computer readable storage media encoded with software comprising computer executable instructions and when the software is executed operable to cause a processor to:
segment an audio stream into a plurality of time segments using speaker segmentation and recognition (SSR), each of the plurality of time segments corresponding to a name label, to produce an SSR transcript;
transcribe the audio stream into a plurality of word regions using automatic speech recognition (ASR), each of the plurality of word regions having an associated accuracy confidence, to produce an ASR transcript;
identify a plurality of low confidence regions from the plurality of word regions, each of the low confidence regions having an associated accuracy confidence below a threshold;
identify at least one likely name region from the ASR transcript using named entity recognition (NER) rules, wherein the NER rules analyze word regions to identify the at least one likely name region, and the NER rules associate each of the at least one likely name regions with a name label from the SSR transcript corresponding to one of a current, previous, or subsequent time segment;
filter the at least one likely name region with the plurality of low confidence regions to determine at least one low confidence name region;
select all of the likely low confidence name regions associated with a selected name label, the selected name label being selected from the name labels in the SSR transcript;
create a phoneme transcript from the audio stream for each of the selected likely name regions using a phoneme decoder; and
correlate the selected name label with all of the phoneme transcripts for the selected likely name regions.

9. The computer readable storage media of claim 8, further comprising computer executable instructions operable to cause the processor to:
create a phoneme string of the selected name label using a grapheme-to-phoneme (G2P) tool;
match at least a portion of the phoneme string of the selected name label with at least a portion of the phoneme transcript for each of the selected likely name regions.

10. The computer readable storage media of claim 8, further comprising computer executable instructions operable to cause the processor to:
create a phoneme string of the selected name label with a grapheme-to-phoneme (G2P) tool;
adjust a length of at least one of the selected likely name regions to match the length of the phoneme string.

11. The computer readable storage media of claim 8, further comprising computer executable instructions operable to cause the processor to update a name pronunciation database, the name pronunciation database correlating a plurality of names with a plurality of phoneme transcripts.

12. The computer readable storage media of claim 8, wherein the name label comprises at least one of a full name, a salutation and last name, or a nickname.

13. The computer readable storage media of claim 8, wherein the automatic speech recognition (ASR) transcript comprises a plurality of time stamps associated with the plurality of word regions.

14. The computer readable storage media of claim 8, wherein the computer executable instructions operable to cause the processor to identify at least one likely name region from the ASR transcript comprises computer executable instructions operable to cause the processor to use NER rules to analyze word regions only in proximity to each of the plurality of low confidence regions.

15. An apparatus comprising:
an input/output interface configured to receive an audio stream;
a processor coupled to the input/output interface and configured to:
segment the audio stream into a plurality of time segments using speaker segmentation and recognition (SSR), each of the plurality of time segments corresponding to a name label, to produce an SSR transcript;
transcribe the audio stream into a plurality of word regions using automatic speech recognition (ASR), each of the plurality of word regions having an associated accuracy confidence, to produce an ASR transcript;
identify a plurality of low confidence regions from the plurality of word regions, each of the low confidence regions having an associated accuracy confidence below a threshold;
identify at least one likely name region from the ASR transcript using named entity recognition (NER) rules, wherein the NER rules analyze word regions to identify the at least one likely name region, and the NER rules associate each of the at least one likely name regions with a name label from the SSR transcript corresponding to one of a current, previous, or next time segment;
filter the at least one likely name region with the plurality of low confidence regions to determine at least one low confidence name region;
select all of the likely low confidence name regions associated with a selected name label, the selected name label being selected from the name labels in the SSR transcript;

create a phoneme transcript from the audio stream for each of the selected likely name regions using a phoneme decoder; and correlate the selected name label with all of the phoneme transcripts for the selected likely name regions.

16. The apparatus of claim 15, wherein the processor is further configured to:

create a phoneme string of the selected name label using a grapheme-to-phoneme (G2P) tool;

match at least a portion of the phoneme string of the selected name label with at least a portion of the phoneme transcript for each of the selected likely name regions.

17. The apparatus of claim 15, wherein the processor is further configured to:

create a phoneme string of the selected name label with a grapheme-to-phoneme (G2P tool;

adjust a length of at least one of the selected likely name regions to match the length of the phoneme string.

18. The apparatus of claim 15, further comprising a network interface configured to update a name pronunciation database, the name pronunciation database correlating a plurality of names with a plurality of phoneme transcripts.

19. The apparatus of claim 15, wherein the name label comprises at least one of a full name, a salutation and last name, or a nickname.

20. The apparatus of claim 15, wherein the automatic speech recognition (ASR) transcript comprises a plurality of time stamps associated with the plurality of word regions.

* * * * *